(12) United States Patent
Sah et al.

(10) Patent No.: US 8,303,463 B2
(45) Date of Patent: Nov. 6, 2012

(54) METHOD AND APPARATUS TO CONTROL CLUTCH FILL PRESSURE IN AN ELECTRO-MECHANICAL TRANSMISSION

(75) Inventors: Jy-Jen F. Sah, West Bloomfield, MI (US); Ali K Naqvi, White Lake, MI (US)

(73) Assignees: GM Global Technology Operations LLC, Detroit, MI (US); Daimler AG, Stuttgart (DE); Chrysler Group LLC, Auburb Hills, MI (US); Bayerische Motoren Werke Aktiengesellschaft, Munich (DE)

( * ) Notice: Subject to any disclaimer, the term of this patent is extended or adjusted under 35 U.S.C. 154(b) by 920 days.

(21) Appl. No.: 12/250,514

(22) Filed: Oct. 13, 2008

(65) Prior Publication Data
US 2009/0111643 A1   Apr. 30, 2009

Related U.S. Application Data

(60) Provisional application No. 60/982,874, filed on Oct. 26, 2007.

(51) Int. Cl.
*B60W 10/08* (2006.01)
*F16H 61/26* (2006.01)
(52) U.S. Cl. ........................................... 477/5; 477/158
(58) Field of Classification Search .................. 477/5, 6, 477/143, 144, 145, 146; 475/116, 118, 120, 475/121, 122; 701/58, 59, 67, 68
See application file for complete search history.

(56) References Cited

U.S. PATENT DOCUMENTS

| | | | | |
|---|---|---|---|---|
| 3,856,047 | A * | 12/1974 | Takayama | 137/625.61 |
| 4,465,168 | A * | 8/1984 | Sato | 192/3.57 |
| 5,046,174 | A * | 9/1991 | Lentz et al. | 701/60 |
| 5,323,668 | A * | 6/1994 | Nakagawa et al. | 477/163 |
| 5,580,333 | A * | 12/1996 | Marusue et al. | 477/145 |
| 5,913,577 | A * | 6/1999 | Arndt | 303/117.1 |
| 6,022,295 | A * | 2/2000 | Liu | 477/180 |
| 6,088,645 | A * | 7/2000 | Kawasaki et al. | 701/67 |
| 6,115,661 | A * | 9/2000 | Hosseini et al. | 701/51 |
| 6,209,695 | B1 * | 4/2001 | Braford, Jr. | 192/3.58 |
| 6,799,108 | B2 * | 9/2004 | Aldrich et al. | 701/51 |
| 6,832,148 | B1 | 12/2004 | Bennett | |
| 6,868,318 | B1 | 3/2005 | Cawthorne | |
| 6,997,300 | B2 * | 2/2006 | Schmidt et al. | 192/85.63 |
| 7,033,297 | B2 * | 4/2006 | Nozaki et al. | 475/129 |
| 7,043,347 | B2 * | 5/2006 | Inoue et al. | 701/67 |
| 7,051,856 | B2 * | 5/2006 | Hessell et al. | 192/85.63 |

(Continued)

FOREIGN PATENT DOCUMENTS
DE   102005059356 A1   6/2007

*Primary Examiner* — Ha D. Ho
*Assistant Examiner* — Jude Agendia

(57) ABSTRACT

A method to control a powertrain including a transmission, an engine, and an electric machine includes applying through a series of clutch fill events a series of incrementally changing command pressures in a pressure control solenoid controllably connected to a clutch within the transmission, monitoring a pressure switch fluidly connected to the pressure control solenoid and configured to indicate when the pressure switch is in a full feed state, determining changes in cycle times of the pressure switch corresponding to sequential applications of the series of incrementally changing command pressures, selecting a preferred command pressure to achieve a transient state in the clutch based upon the changes in pressure switch cycle times, and controlling the clutch based upon the preferred command pressure.

12 Claims, 6 Drawing Sheets

U.S. PATENT DOCUMENTS

| | | | |
|---|---|---|---|
| 7,066,862 B2* | 6/2006 | Bothe et al. | 477/143 |
| 7,154,236 B1 | 12/2006 | Heap | |
| 7,338,408 B2* | 3/2008 | Petrzik et al. | 477/174 |
| 7,374,513 B2* | 5/2008 | Whitton | 477/146 |
| 7,559,866 B2* | 7/2009 | Kondoh et al. | 475/127 |
| 7,670,252 B2* | 3/2010 | Wu et al. | 477/3 |
| 7,670,254 B2* | 3/2010 | Wu et al. | 477/5 |
| 7,731,630 B2* | 6/2010 | League et al. | 477/155 |
| 7,850,572 B2* | 12/2010 | Hwang et al. | 477/86 |
| 7,878,932 B2* | 2/2011 | Martini et al. | 475/5 |
| 7,909,733 B2* | 3/2011 | Imediegwu | 477/143 |
| 2002/0035012 A1* | 3/2002 | Murasugi et al. | 477/86 |
| 2002/0091035 A1* | 7/2002 | Monowa et al. | 477/143 |
| 2004/0063543 A1* | 4/2004 | Wakayama | 477/175 |
| 2004/0116245 A1* | 6/2004 | Yamamoto et al. | 477/46 |
| 2005/0076958 A1 | 4/2005 | Foster | |
| 2005/0077867 A1 | 4/2005 | Cawthorne | |
| 2005/0077877 A1 | 4/2005 | Cawthorne | |
| 2005/0080523 A1 | 4/2005 | Bennett | |
| 2005/0080527 A1 | 4/2005 | Tao | |
| 2005/0080535 A1 | 4/2005 | Steinmetz | |
| 2005/0080537 A1 | 4/2005 | Cawthorne | |
| 2005/0080538 A1 | 4/2005 | Hubbard | |
| 2005/0080539 A1 | 4/2005 | Hubbard | |
| 2005/0080540 A1 | 4/2005 | Steinmetz | |
| 2005/0080541 A1 | 4/2005 | Sah | |
| 2005/0107201 A1* | 5/2005 | Cicala et al. | 475/116 |
| 2005/0182526 A1 | 8/2005 | Hubbard | |
| 2005/0182543 A1 | 8/2005 | Sah | |
| 2005/0182546 A1 | 8/2005 | Hsieh | |
| 2005/0182547 A1 | 8/2005 | Sah | |
| 2005/0189918 A1 | 9/2005 | Weisgerber | |
| 2005/0252283 A1 | 11/2005 | Heap | |
| 2005/0252305 A1 | 11/2005 | Hubbard | |
| 2005/0252474 A1 | 11/2005 | Sah | |
| 2005/0255963 A1 | 11/2005 | Hsieh | |
| 2005/0255964 A1 | 11/2005 | Heap | |
| 2005/0255965 A1 | 11/2005 | Tao | |
| 2005/0255966 A1 | 11/2005 | Tao | |
| 2005/0255967 A1 | 11/2005 | Foster | |
| 2005/0255968 A1 | 11/2005 | Sah | |
| 2005/0256617 A1 | 11/2005 | Cawthorne | |
| 2005/0256618 A1 | 11/2005 | Hsieh | |
| 2005/0256623 A1 | 11/2005 | Hubbard | |
| 2005/0256625 A1 | 11/2005 | Sah | |
| 2005/0256626 A1 | 11/2005 | Hsieh | |
| 2005/0256627 A1 | 11/2005 | Sah | |
| 2005/0256629 A1 | 11/2005 | Tao | |
| 2005/0256631 A1 | 11/2005 | Cawthorne | |
| 2005/0256633 A1 | 11/2005 | Heap | |
| 2005/0256919 A1 | 11/2005 | Cawthorne | |
| 2005/0288153 A1* | 12/2005 | Whitton | 477/146 |
| 2006/0089775 A1* | 4/2006 | Whitton et al. | 701/51 |
| 2006/0189436 A1* | 8/2006 | Nakashima et al. | 477/174 |
| 2006/0194670 A1 | 8/2006 | Heap | |
| 2007/0010373 A1* | 1/2007 | Meyer et al. | 477/143 |
| 2007/0051580 A1* | 3/2007 | Gunderson et al. | 192/85 R |
| 2007/0078580 A1 | 4/2007 | Cawthorne | |
| 2007/0093953 A1 | 4/2007 | Heap | |
| 2007/0099739 A1* | 5/2007 | Foster et al. | 475/120 |
| 2007/0149348 A1 | 6/2007 | Holmes | |
| 2007/0179017 A1* | 8/2007 | Yamada et al. | 477/107 |
| 2007/0191181 A1 | 8/2007 | Burns | |
| 2007/0199782 A1* | 8/2007 | Mizuno et al. | 192/3.58 |
| 2007/0219047 A1* | 9/2007 | Nakatani et al. | 477/95 |
| 2007/0220879 A1 | 9/2007 | Lochocki et al. | |
| 2007/0221467 A1 | 9/2007 | Stevenson et al. | |
| 2007/0225886 A1 | 9/2007 | Morris | |
| 2007/0225887 A1 | 9/2007 | Morris | |
| 2007/0225888 A1 | 9/2007 | Morris | |
| 2007/0225889 A1 | 9/2007 | Morris | |
| 2007/0260381 A1 | 11/2007 | Sah | |
| 2007/0276569 A1 | 11/2007 | Sah | |
| 2007/0284162 A1 | 12/2007 | Zettel | |
| 2007/0284163 A1 | 12/2007 | Heap | |
| 2007/0284176 A1 | 12/2007 | Sah | |
| 2007/0285059 A1 | 12/2007 | Zettel | |
| 2007/0285060 A1 | 12/2007 | Zettel | |
| 2007/0285061 A1 | 12/2007 | Zettel | |
| 2007/0285063 A1 | 12/2007 | Zettel | |
| 2007/0285097 A1 | 12/2007 | Zettel | |
| 2008/0004779 A1 | 1/2008 | Sah | |
| 2008/0028879 A1 | 2/2008 | Robinette | |
| 2008/0032855 A1 | 2/2008 | Sah | |
| 2008/0032861 A1* | 2/2008 | Maki et al. | 477/143 |
| 2008/0064559 A1 | 3/2008 | Cawthorne | |
| 2008/0064562 A1 | 3/2008 | Aettel et al. | |
| 2008/0103003 A1 | 5/2008 | Sah | |
| 2008/0119320 A1 | 5/2008 | Wu | |
| 2008/0119321 A1 | 5/2008 | Heap | |
| 2008/0120000 A1 | 5/2008 | Heap | |
| 2008/0120001 A1 | 5/2008 | Heap | |
| 2008/0120002 A1 | 5/2008 | Heap | |
| 2008/0161159 A1* | 7/2008 | Runde et al. | 477/156 |
| 2008/0176706 A1 | 7/2008 | Wu | |
| 2008/0176709 A1* | 7/2008 | Wu et al. | 477/143 |
| 2008/0181280 A1 | 7/2008 | Wang | |
| 2008/0182696 A1 | 7/2008 | Sah | |
| 2008/0183372 A1 | 7/2008 | Snyder | |
| 2008/0234097 A1 | 9/2008 | Sah | |
| 2008/0236921 A1 | 10/2008 | Huseman | |
| 2008/0243346 A1 | 10/2008 | Huseman | |
| 2008/0249745 A1 | 10/2008 | Heap | |
| 2008/0262694 A1 | 10/2008 | Heap | |
| 2008/0262698 A1 | 10/2008 | Lahti | |
| 2008/0272717 A1 | 11/2008 | Gleason | |
| 2008/0275611 A1* | 11/2008 | Snyder | 701/51 |
| 2008/0275624 A1 | 11/2008 | Snyder | |
| 2008/0275625 A1 | 11/2008 | Snyder | |
| 2008/0287255 A1 | 11/2008 | Snyder | |
| 2009/0036265 A1* | 2/2009 | Hwang et al. | 477/76 |
| 2009/0069148 A1* | 3/2009 | Heap | 477/5 |
| 2009/0069989 A1 | 3/2009 | Heap | |
| 2009/0070019 A1 | 3/2009 | Heap | |
| 2009/0076689 A1* | 3/2009 | Dickinson et al. | 701/51 |
| 2009/0082170 A1 | 3/2009 | Heap | |
| 2009/0088294 A1 | 4/2009 | West | |
| 2009/0105039 A1 | 4/2009 | Sah | |
| 2009/0105896 A1 | 4/2009 | Tamai | |
| 2009/0105898 A1 | 4/2009 | Wu | |
| 2009/0105914 A1 | 4/2009 | Buur | |
| 2009/0107745 A1 | 4/2009 | Buur | |
| 2009/0107755 A1 | 4/2009 | Kothari | |
| 2009/0108673 A1 | 4/2009 | Wang | |
| 2009/0111637 A1* | 4/2009 | Day et al. | 475/159 |
| 2009/0111640 A1 | 4/2009 | Buur | |
| 2009/0111642 A1 | 4/2009 | Sah | |
| 2009/0111644 A1 | 4/2009 | Kaminsky | |
| 2009/0111645 A1* | 4/2009 | Heap et al. | 477/5 |
| 2009/0112385 A1 | 4/2009 | Heap | |
| 2009/0112392 A1 | 4/2009 | Buur | |
| 2009/0112399 A1 | 4/2009 | Buur | |
| 2009/0112412 A1 | 4/2009 | Cawthorne | |
| 2009/0112416 A1 | 4/2009 | Heap | |
| 2009/0112417 A1 | 4/2009 | Kaminsky | |
| 2009/0112418 A1 | 4/2009 | Buur | |
| 2009/0112419 A1 | 4/2009 | Heap | |
| 2009/0112420 A1 | 4/2009 | Buur | |
| 2009/0112421 A1 | 4/2009 | Sah | |
| 2009/0112422 A1 | 4/2009 | Sah | |
| 2009/0112423 A1 | 4/2009 | Foster | |
| 2009/0112427 A1 | 4/2009 | Heap | |
| 2009/0112428 A1 | 4/2009 | Sah | |
| 2009/0112429 A1 | 4/2009 | Sah | |
| 2009/0112495 A1 | 4/2009 | Center | |
| 2009/0115349 A1 | 5/2009 | Heap | |
| 2009/0115350 A1 | 5/2009 | Heap | |
| 2009/0115351 A1 | 5/2009 | Heap | |
| 2009/0115352 A1 | 5/2009 | Heap | |
| 2009/0115353 A1 | 5/2009 | Heap | |
| 2009/0115354 A1 | 5/2009 | Heap | |
| 2009/0115365 A1 | 5/2009 | Heap | |
| 2009/0115373 A1 | 5/2009 | Kokotovich | |
| 2009/0115377 A1 | 5/2009 | Schwenke | |
| 2009/0115408 A1 | 5/2009 | West | |
| 2009/0115491 A1 | 5/2009 | Anwar | |
| 2009/0118074 A1 | 5/2009 | Zettel | |

| | | | | | |
|---|---|---|---|---|---|
| 2009/0118075 A1 | 5/2009 | Heap | 2009/0118926 A1 | 5/2009 | Heap |
| 2009/0118076 A1 | 5/2009 | Heap | 2009/0118927 A1 | 5/2009 | Heap |
| 2009/0118077 A1 | 5/2009 | Hsieh | 2009/0118928 A1 | 5/2009 | Heap |
| 2009/0118078 A1 | 5/2009 | Wilmanowicz | 2009/0118929 A1 | 5/2009 | Heap |
| 2009/0118079 A1 | 5/2009 | Heap | 2009/0118930 A1 | 5/2009 | Heap |
| 2009/0118080 A1 | 5/2009 | Heap | 2009/0118931 A1 | 5/2009 | Kaminsky |
| 2009/0118081 A1 | 5/2009 | Heap | 2009/0118932 A1 | 5/2009 | Heap |
| 2009/0118082 A1 | 5/2009 | Heap | 2009/0118933 A1 | 5/2009 | Heap |
| 2009/0118083 A1 | 5/2009 | Kaminsky | 2009/0118934 A1 | 5/2009 | Heap |
| 2009/0118084 A1 | 5/2009 | Heap | 2009/0118935 A1 | 5/2009 | Heap |
| 2009/0118085 A1 | 5/2009 | Heap | 2009/0118936 A1 | 5/2009 | Heap |
| 2009/0118086 A1 | 5/2009 | Heap | 2009/0118937 A1 | 5/2009 | Heap |
| 2009/0118087 A1 | 5/2009 | Hsieh | 2009/0118938 A1 | 5/2009 | Heap |
| 2009/0118089 A1 | 5/2009 | Heap | 2009/0118939 A1 | 5/2009 | Heap |
| 2009/0118090 A1 | 5/2009 | Heap | 2009/0118940 A1 | 5/2009 | Heap |
| 2009/0118091 A1 | 5/2009 | Lahti | 2009/0118941 A1 | 5/2009 | Heap |
| 2009/0118093 A1 | 5/2009 | Heap | 2009/0118942 A1 | 5/2009 | Hsieh |
| 2009/0118094 A1 | 5/2009 | Hsieh | 2009/0118943 A1 | 5/2009 | Heap |
| 2009/0118877 A1 | 5/2009 | Center | 2009/0118944 A1 | 5/2009 | Heap |
| 2009/0118879 A1 | 5/2009 | Heap | 2009/0118945 A1 | 5/2009 | Heap |
| 2009/0118880 A1 | 5/2009 | Heap | 2009/0118946 A1 | 5/2009 | Heap |
| 2009/0118882 A1 | 5/2009 | Heap | 2009/0118947 A1 | 5/2009 | Heap |
| 2009/0118883 A1 | 5/2009 | Heap | 2009/0118948 A1 | 5/2009 | Heap |
| 2009/0118884 A1 | 5/2009 | Heap | 2009/0118949 A1 | 5/2009 | Heap |
| 2009/0118885 A1 | 5/2009 | Heap | 2009/0118950 A1 | 5/2009 | Heap |
| 2009/0118886 A1 | 5/2009 | Tamai | 2009/0118951 A1 | 5/2009 | Heap |
| 2009/0118887 A1 | 5/2009 | Minarcin | 2009/0118952 A1 | 5/2009 | Heap |
| 2009/0118888 A1 | 5/2009 | Minarcin | 2009/0118954 A1 | 5/2009 | Wu |
| 2009/0118901 A1 | 5/2009 | Cawthorne | 2009/0118957 A1 | 5/2009 | Heap |
| 2009/0118914 A1 | 5/2009 | Schwenke | 2009/0118962 A1 | 5/2009 | Heap |
| 2009/0118915 A1 | 5/2009 | Heap | 2009/0118963 A1 | 5/2009 | Heap |
| 2009/0118916 A1 | 5/2009 | Kothari | 2009/0118964 A1 | 5/2009 | Snyder |
| 2009/0118917 A1 | 5/2009 | Sah | 2009/0118969 A1 | 5/2009 | Heap |
| 2009/0118918 A1 | 5/2009 | Heap | 2009/0118971 A1 | 5/2009 | Heap |
| 2009/0118919 A1 | 5/2009 | Heap | 2009/0118999 A1 | 5/2009 | Heap |
| 2009/0118920 A1 | 5/2009 | Heap | 2009/0144002 A1 | 6/2009 | Zettel |
| 2009/0118921 A1 | 5/2009 | Heap | 2009/0209383 A1* | 8/2009 | Olson et al. .................. 475/120 |
| 2009/0118922 A1 | 5/2009 | Heap | 2009/0222180 A1* | 9/2009 | Kraenzlein et al. ............ 701/59 |
| 2009/0118923 A1 | 5/2009 | Heap | 2011/0028271 A1* | 2/2011 | Whitmarsh et al. ............ 477/86 |
| 2009/0118924 A1* | 5/2009 | Hsieh et al. ..................... 701/54 | | | |
| 2009/0118925 A1 | 5/2009 | Hsieh | | | |

\* cited by examiner

METHOD AND APPARATUS TO CONTROL CLUTCH FILL PRESSURE IN AN ELECTRO-MECHANICAL TRANSMISSION

CROSS REFERENCE TO RELATED APPLICATIONS

This application claims the benefit of U.S. Provisional Application No. 60/982,874 filed on Oct. 26, 2007 which is hereby incorporated herein by reference.

TECHNICAL FIELD

This disclosure pertains to control systems for electro-mechanical transmissions.

BACKGROUND

The statements in this section merely provide background information related to the present disclosure and may not constitute prior art.

Known powertrain architectures include torque-generative devices, including internal combustion engines and electric machines, which transmit torque through a transmission device to an output member. One exemplary powertrain includes a two-mode, compound-split, electro-mechanical transmission which utilizes an input member for receiving motive torque from a prime mover power source, preferably an internal combustion engine, and an output member. The output member can be operatively connected to a driveline for a motor vehicle for transmitting tractive torque thereto. Electric machines, operative as motors or generators, generate a torque input to the transmission, independently of a torque input from the internal combustion engine. The electric machines may transform vehicle kinetic energy, transmitted through the vehicle driveline, to electrical energy that is storable in an electrical energy storage device. A control system monitors various inputs from the vehicle and the operator and provides operational control of the powertrain, including controlling transmission operating state and gear shifting, controlling the torque-generative devices, and regulating the electrical power interchange among the electrical energy storage device and the electric machines to manage outputs of the transmission, including torque and rotational speed. A hydraulic control system is known to provide pressurized hydraulic oil for a number of functions throughout the powertrain.

Operation of the above devices within a hybrid powertrain vehicle require management of numerous torque bearing shafts or devices representing connections to the above mentioned engine, electrical machines, and driveline. Input torque from the engine and input torque from the electric machine or electric machines can be applied individually or cooperatively to provide output torque. Various control schemes and operational connections between the various aforementioned components of the hybrid drive system are known, and the control system must be able to engage to and disengage the various components from the transmission in order to perform the functions of the hybrid powertrain system. Engagement and disengagement are known to be accomplished within the transmission by employing selectively operable clutches.

Clutches are devices well known in the art for engaging and disengaging shafts including the management of rotational velocity and torque differences between the shafts. Clutches are known in a variety of designs and control methods. One known type of clutch is a mechanical clutch operating by separating or joining two connective surfaces, for instance, clutch plates, operating, when joined, to apply frictional torque to each other. One control method for operating such a mechanical clutch includes applying the hydraulic control system implementing fluidic pressures transmitted through hydraulic lines to exert or release clamping force between the two connective surfaces. Operated thusly, the clutch is not operated in a binary manner, but rather is capable of a range of engagement states, from fully disengaged, to synchronized but not engaged, to engaged but with only minimal clamping force, to engaged with some maximum clamping force. The clamping force available to be applied to the clutch determines how much reactive torque the clutch can transmit before the clutch slips.

The hydraulic control system, as described above, utilizes lines charged with hydraulic oil to selectively activate clutches within the transmission. Hydraulic switches or pressure control solenoids (PCS) are used to selectively apply pressure within a hydraulic control system. A PCS can be electrically controlled, for instance with a magnetically actuated solenoid device, well known in the art. Alternatively, a PCS can be hydraulically controlled, for example, actuated by a command pressure and a return spring. Features within the PCS selectively channel or block hydraulic oil from passing therethrough depending upon the actuation state of the PCS. In a blocked state, a PCS is known to include an exhaust path, allowing any trapped hydraulic oil to escape, thereby de-energizing the connected hydraulic circuit in order to complete the actuation cycle. Modulation of the command pressure can enable the PCS to be linearly, variably actuated, including actuation controlling application of fill pressure to the clutch in order to achieve within the clutch some middle or transient state between full feed and exhaust states.

A hydraulically actuated clutch operates by receiving pressurized hydraulic oil into a clutch volume chamber. Hydraulic oil in this clutch volume chamber exerts pressure upon features within the volume chamber. A piston or similar structure is known to be utilized to transform this hydraulic pressure into an articulation, for example a translating motion or compressing force. In an exemplary hydraulically actuated clutch, pressurized hydraulic oil is used to fill a clutch volume chamber and thereby displace a clutch piston in order to selectively apply a compression force to the connective surfaces of the clutch. A restoring force, for example as provided by a return spring, is known to be used to counter the compressive force of the hydraulic oil. As described above, clutches are known to be engaged through a range of engagement states. An exemplary clutch with all hydraulic pressure removed can be in an unlocked state. An exemplary clutch with maximum hydraulic pressure can be in a locked state. An exemplary clutch with some partial hydraulic force applied, wherein the force of the hydraulic oil and the force of a return spring are substantially equal, the clutch can be in a touching state, with the plates in contact but with little or no clamping force applied.

An engagement of a clutch, accomplished through a clutch fill event, is known to be accomplished as rapidly as possible, with some minimum hydraulic pressure being maintained to assure rapid flow of the hydraulic oil into the clutch volume. However, rapid engagement of a clutch can cause a perceptible bump in the vehicle and cause shortened life of the component involved. A shock absorbing device can be utilized to dampen the force of the rapid fill of the clutch volume chamber upon the clutch. For example, a wave plate including a spring feature can be used between the cylinder piston and the clutch to absorb rapid increases in hydraulic pressure. The touching state described above can be defined as the clutch filled with enough hydraulic oil to cause zero force contact of the wave plate.

Clutch actuation status, such as would be indicated by a position sensor on a piston, is frequently not directly monitored. Such sensors would tend to be expensive, inaccurate, and increase warranty concerns. However, as described above, clutch operation in synchronous operation through a plurality of actuation states is a complicated process including multiple overlapping steps and control strategies. A method allowing utilization of a command pressure to precisely actuate a clutch to an important transient state such as a touching state would be beneficial.

SUMMARY

A powertrain includes an electro-mechanical transmission mechanically-operatively coupled to an internal combustion engine and an electric machine adapted to selectively transmit mechanical power to an output member via selective application of a plurality of hydraulically-applied torque transfer clutches. A method to control the powertrain includes applying through a series of clutch fill events a series of incrementally changing command pressures in a pressure control solenoid controllably connected to one of the clutches, monitoring a pressure switch fluidly connected to the pressure control solenoid and configured to indicate when the pressure switch is in a full feed state, determining changes in cycle times of the pressure switch corresponding to sequential applications of the series of incrementally changing command pressures, selecting a preferred command pressure to achieve a transient state in the clutch based upon the changes in pressure switch cycle times, and controlling the clutch based upon the preferred command pressure.

BRIEF DESCRIPTION OF THE DRAWINGS

One or more embodiments will now be described, by way of example, with reference to the accompanying drawings, in which.

DETAILED DESCRIPTION

Figure 1:
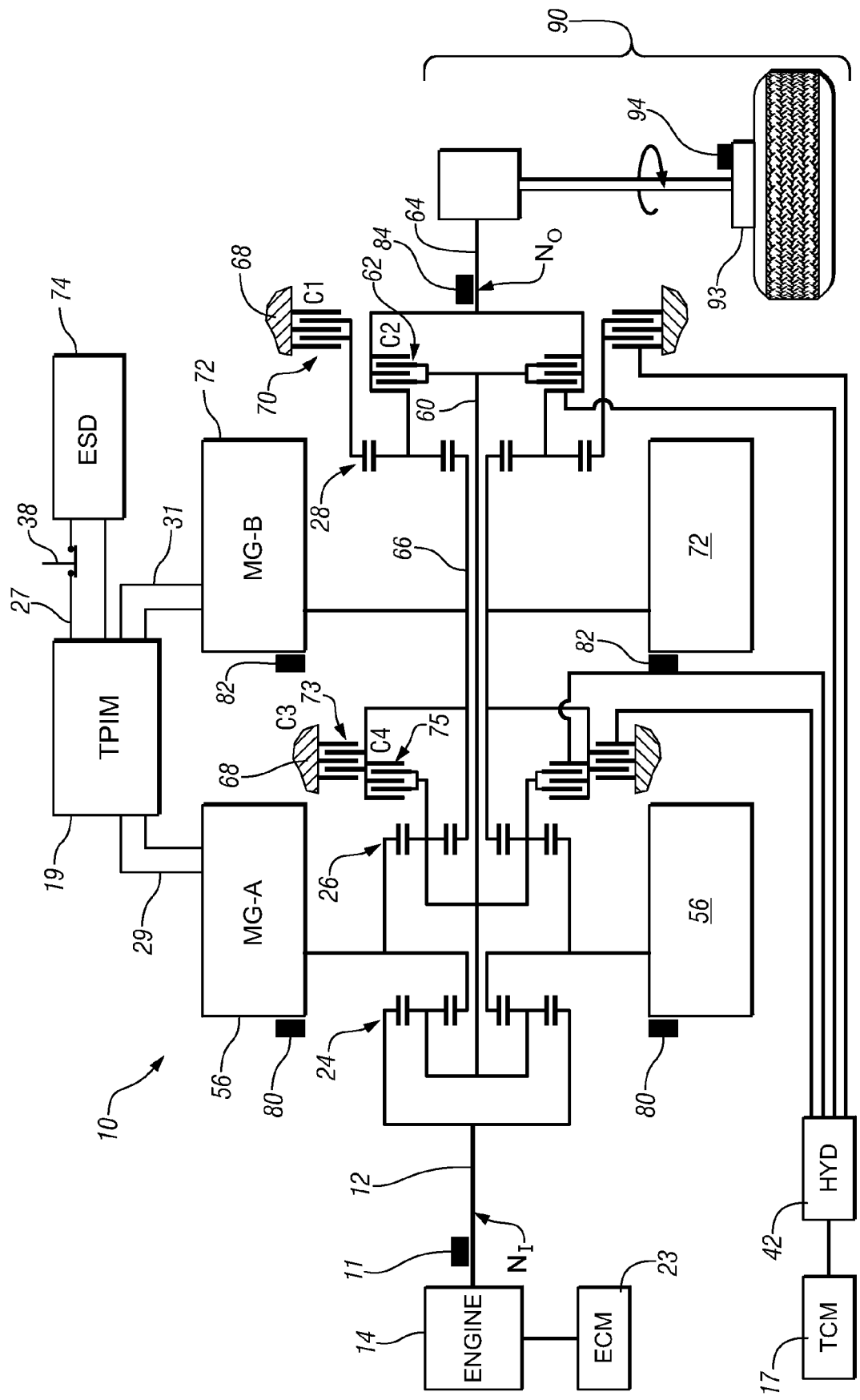
FIG. 1 is a schematic diagram of an exemplary powertrain, in accordance with the present disclosure.
Figure 2:
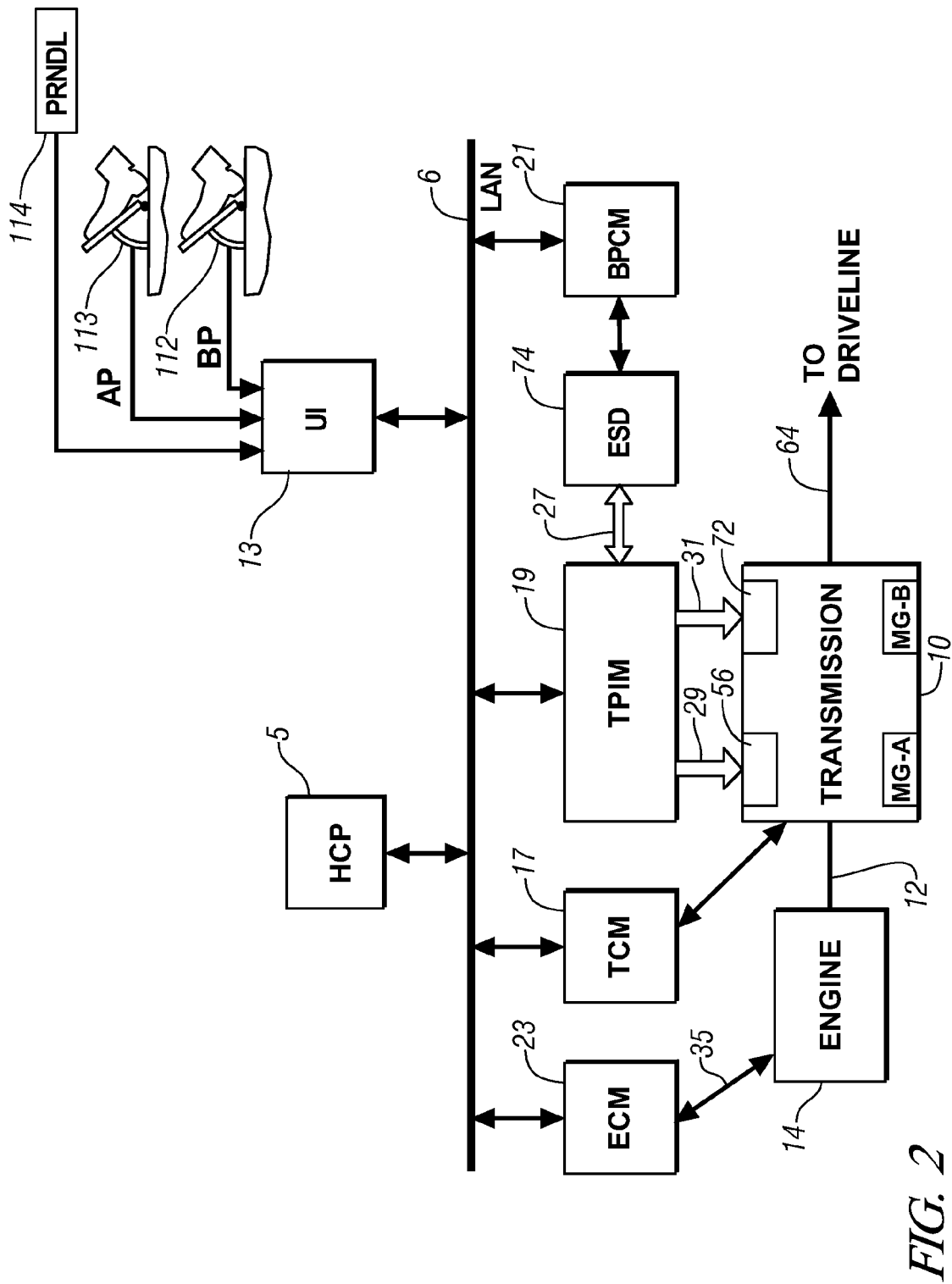
FIG. 2 is a schematic diagram of an exemplary architecture for a control system and powertrain, in accordance with the present disclosure.

Referring now to the drawings, wherein the showings are for the purpose of illustrating certain exemplary embodiments only and not for the purpose of limiting the same, FIGS. 1 and 2 depict an exemplary electro-mechanical hybrid powertrain. The exemplary electro-mechanical hybrid powertrain in accordance with the present disclosure is depicted in FIG. 1, comprising a two-mode, compound-split, electro-mechanical hybrid transmission 10 operatively connected to an engine 14 and first and second electric machines ('MG-A') 56 and ('MG-B') 72. The engine 14 and first and second electric machines 56 and 72 each generate power which can be transmitted to the transmission 10. The power generated by the engine 14 and the first and second electric machines 56 and 72 and transmitted to the transmission 10 is described in terms of input torques, referred to herein as $T_I$, $T_A$, and $T_B$ respectively, and speed, referred to herein as $N_I$, $N_A$, and $N_B$, respectively.

The exemplary engine 14 comprises a multi-cylinder internal combustion engine selectively operative in several states to transmit torque to the transmission 10 via an input shaft 12, and can be either a spark-ignition or a compression-ignition engine. The engine 14 includes a crankshaft (not shown) operatively coupled to the input shaft 12 of the transmission 10. A rotational speed sensor 11 monitors rotational speed of the input shaft 12. Power output from the engine 14, comprising rotational speed and output torque, can differ from the input speed, $N_I$, and the input torque, $T_I$, to the transmission 10 due to placement of torque-consuming components on the input shaft 12 between the engine 14 and the transmission 10, e.g., a hydraulic pump (not shown) and/or a torque management device (not shown).

The exemplary transmission 10 comprises three planetary-gear sets 24, 26 and 28, and four selectively engageable torque-transmitting devices, i.e., clutches C1 70, C2 62, C3 73, and C4 75. As used herein, clutches refer to any type of friction torque transfer device including single or compound plate clutches or packs, band clutches, and brakes, for example. A hydraulic control circuit 42, preferably controlled by a transmission control module (hereafter 'TCM') 17, is operative to control clutch states. Clutches C2 62 and C4 75 preferably comprise hydraulically-applied rotating friction clutches. Clutches C1 70 and C3 73 preferably comprise hydraulically-controlled stationary devices that can be selectively grounded to a transmission case 68. Each of the clutches C1 70, C2 62, C3 73, and C4 75 is preferably hydraulically applied, selectively receiving pressurized hydraulic oil via the hydraulic control circuit 42.

The first and second electric machines 56 and 72 preferably comprise three-phase AC machines, each including a stator (not shown) and a rotor (not shown), and respective resolvers 80 and 82. The motor stator for each machine is grounded to an outer portion of the transmission case 68, and includes a stator core with coiled electrical windings extending therefrom. The rotor for the first electric machine 56 is supported on a hub plate gear that is operatively attached to shaft 60 via the second planetary gear set 26. The rotor for the second electric machine 72 is fixedly attached to a sleeve shaft hub 66.

Each of the resolvers 80 and 82 preferably comprises a variable reluctance device including a resolver stator (not shown) and a resolver rotor (not shown). The resolvers 80 and 82 are appropriately positioned and assembled on respective ones of the first and second electric machines 56 and 72. Stators of respective ones of the resolvers 80 and 82 are operatively connected to one of the stators for the first and second electric machines 56 and 72. The resolver rotors are operatively connected to the rotor for the corresponding first and second electric machines 56 and 72. Each of the resolvers 80 and 82 is signally and operatively connected to a transmission power inverter control module (hereafter 'TPIM') 19, and each senses and monitors rotational position of the resolver rotor relative to the resolver stator, thus monitoring rotational position of respective ones of first and second electric machines 56 and 72. Additionally, the signals output from the resolvers 80 and 82 are interpreted to provide the rotational speeds for first and second electric machines 56 and 72, i.e., $N_A$ and $N_B$, respectively.

The transmission 10 includes an output member 64, e.g. a shaft, which is operably connected to a driveline 90 for a vehicle (not shown), to provide output power, e.g., to vehicle wheels 93, one of which is shown in FIG. 1. The output power is characterized in terms of an output rotational speed, $N_O$ and an output torque, $T_O$. A transmission output speed sensor 84 monitors rotational speed and rotational direction of the output member 64. Each of the vehicle wheels 93, is preferably equipped with a sensor 94 adapted to monitor wheel speed, $V_{SS\text{-}WHL}$, the output of which is monitored by a control module of a distributed control module system described with respect to FIG. 2, to determine vehicle speed, and absolute and relative wheel speeds for braking control, traction control, and vehicle acceleration management.

The input torques from the engine 14 and the first and second electric machines 56 and 72 ($T_I$, $T_A$, and $T_B$ respectively) are generated as a result of energy conversion from fuel or electrical potential stored in an electrical energy storage device (hereafter 'ESD') 74. The ESD 74 is high voltage DC-coupled to the TPIM 19 via DC transfer conductors 27. The transfer conductors 27 include a contactor switch 38. When the contactor switch 38 is closed, under normal operation, electric current can flow between the ESD 74 and the TPIM 19. When the contactor switch 38 is opened electric current flow between the ESD 74 and the TPIM 19 is interrupted. The TPIM 19 transmits electrical power to and from the first electric machine 56 by transfer conductors 29, and the TPIM 19 similarly transmits electrical power to and from the second electric machine 72 by transfer conductors 31, in response to torque commands for the first and second electric machines 56 and 72 to achieve the input torques $T_A$ and $T_B$. Electrical current is transmitted to and from the ESD 74 in accordance with whether the ESD 74 is being charged or discharged.

The TPIM 19 includes the pair of power inverters (not shown) and respective motor control modules (not shown) configured to receive the torque commands and control inverter states therefrom for providing motor drive or regeneration functionality to meet the commanded motor torques $T_A$ and $T_B$. The power inverters comprise known complementary three-phase power electronics devices, and each includes a plurality of insulated gate bipolar transistors (not shown) for converting DC power from the ESD 74 to AC power for powering respective ones of the first and second electric machines 56 and 72, by switching at high frequencies. The insulated gate bipolar transistors form a switch mode power supply configured to receive control commands. There is typically one pair of insulated gate bipolar transistors for each phase of each of the three-phase electric machines. States of the insulated gate bipolar transistors are controlled to provide motor drive mechanical power generation or electric power regeneration functionality. The three-phase inverters receive or supply DC electric power via DC transfer conductors 27 and transform it to or from three-phase AC power, which is conducted to or from the first and second electric machines 56 and 72 for operation as motors or generators via transfer conductors 29 and 31 respectively.

FIG. 2 is a schematic block diagram of the distributed control module system. The elements described hereinafter comprise a subset of an overall vehicle control architecture, and provide coordinated system control of the exemplary powertrain described in FIG. 1. The distributed control module system synthesizes pertinent information and inputs, and executes algorithms to control various actuators to achieve control objectives, including objectives related to fuel economy, emissions, performance, drivability, and protection of hardware, including batteries of ESD 74 and the first and second electric machines 56 and 72. The distributed control module system includes an engine control module (hereafter 'ECM') 23, the TCM 17, a battery pack control module (hereafter 'BPCM') 21, and the TPIM 19. A hybrid control module (hereafter 'HCP') 5 provides supervisory control and coordination of the ECM 23, the TCM 17, the BPCM 21, and the TPIM 19. A user interface ('UI') 13 is operatively connected to a plurality of devices through which a vehicle operator controls or directs operation of the electro-mechanical hybrid powertrain. The devices include an accelerator pedal 113 ('AP') from which an operator torque request is determined, an operator brake pedal 112 ('BP'), a transmission gear selector 114 ('PRNDL'), and a vehicle speed cruise control (not shown). The transmission gear selector 114 may have a discrete number of operator-selectable positions, including the rotational direction of the output member 64 to enable one of a forward and a reverse direction.

The aforementioned control modules communicate with other control modules, sensors, and actuators via a local area network (hereafter 'LAN') bus 6. The LAN bus 6 allows for structured communication of states of operating parameters and actuator command signals between the various control modules. The specific communication protocol utilized is application-specific. The LAN bus 6 and appropriate protocols provide for robust messaging and multi-control module interfacing between the aforementioned control modules, and other control modules providing functionality such as antilock braking, traction control, and vehicle stability. Multiple communications buses may be used to improve communications speed and provide some level of signal redundancy and integrity. Communication between individual control modules can also be effected using a direct link, e.g., a serial peripheral interface ('SPI') bus (not shown).

The HCP 5 provides supervisory control of the powertrain, serving to coordinate operation of the ECM 23, TCM 17, TPIM 19, and BPCM 21. Based upon various input signals from the user interface 13 and the powertrain, including the ESD 74, the HCP 5 generates various commands, including: the operator torque request ('$T_{O\_REQ}$'), a commanded output torque ('$T_{CMD}$') to the driveline 90, an engine input torque command, clutch torques for the torque-transfer clutches C1 70, C2 62, C3 73, C4 75 of the transmission 10; and the torque commands for the first and second electric machines 56 and 72, respectively. The TCM 17 is operatively connected to the hydraulic control circuit 42 and provides various functions including monitoring various pressure sensing devices (not shown) and generating and communicating control signals to various solenoids (not shown) thereby controlling pressure switches and control valves contained within the hydraulic control circuit 42.

The ECM 23 is operatively connected to the engine 14, and functions to acquire data from sensors and control actuators of the engine 14 over a plurality of discrete lines, shown for simplicity as an aggregate bi-directional interface cable 35. The ECM 23 receives the engine input torque command from the HCP 5. The ECM 23 determines the actual engine input torque, $T_I$, provided to the transmission 10 at that point in time based upon monitored engine speed and load, which is communicated to the HCP 5. The ECM 23 monitors input from the rotational speed sensor 11 to determine the engine input speed to the input shaft 12, which translates to the transmission input speed, $N_I$. The ECM 23 monitors inputs from sensors (not shown) to determine states of other engine operating parameters including, e.g., a manifold pressure, engine coolant temperature, ambient air temperature, and ambient pressure. The engine load can be determined, for example, from the manifold pressure, or alternatively, from monitoring operator input to the accelerator pedal 113. The ECM 23 generates and communicates command signals to control engine actuators, including, e.g., fuel injectors, ignition modules, and throttle control modules, none of which are shown.

The TCM 17 is operatively connected to the transmission 10 and monitors inputs from sensors (not shown) to determine states of transmission operating parameters. The TCM 17 generates and communicates command signals to control the transmission 10, including controlling the hydraulic control circuit 42. Inputs from the TCM 17 to the HCP 5 include estimated clutch torques for each of the clutches, i.e., C1 70, C2 62, C3 73, and C4 75, and rotational output speed, $N_O$, of the output member 64. Other actuators and sensors may be used to provide additional information from the TCM 17 to the HCP 5 for control purposes. The TCM 17 monitors inputs from pressure switches (not shown) and selectively actuates pressure control solenoids (not shown) and shift solenoids (not shown) of the hydraulic control circuit 42 to selectively actuate the various clutches C1 70, C2 62, C3 73, and C4 75 to achieve various transmission operating range states, as described hereinbelow.

The BPCM 21 is signally connected to sensors (not shown) to monitor the ESD 74, including states of electrical current and voltage parameters, to provide information indicative of parametric states of the batteries of the ESD 74 to the HCP 5. The parametric states of the batteries preferably include battery state-of-charge, battery voltage, battery temperature, and available battery power, referred to as a range $P_{BAT}\_MIN$ to $P_{BAT}\_MAX$.

Each of the control modules ECM 23, TCM 17, TPIM 19 and BPCM 21 is preferably a general-purpose digital computer comprising a microprocessor or central processing unit, storage mediums comprising read only memory ('ROM'), random access memory ('RAM'), electrically programmable read only memory ('EPROM'), a high speed clock, analog to digital ('A/D') and digital to analog ('D/A') circuitry, and input/output circuitry and devices ('I/O') and appropriate signal conditioning and buffer circuitry. Each of the control modules has a set of control algorithms, comprising resident program instructions and calibrations stored in one of the storage mediums and executed to provide the respective functions of each computer. Information transfer between the control modules is preferably accomplished using the LAN bus 6 and SPI buses. The control algorithms are executed during preset loop cycles such that each algorithm is executed at least once each loop cycle. Algorithms stored in the non-volatile memory devices are executed by one of the central processing units to monitor inputs from the sensing devices and execute control and diagnostic routines to control operation of the actuators, using preset calibrations. Loop cycles are executed at regular intervals, for example each 3.125, 6.25, 12.5, 25 and 100 milliseconds during ongoing operation of the powertrain. Alternatively, algorithms may be executed in response to the occurrence of an event.

The exemplary powertrain selectively operates in one of several operating range states that can be described in terms of an engine state comprising one of an engine on state ('ON') and an engine off state ('OFF'), and a transmission state comprising a plurality of fixed gears and continuously variable operating modes, described with reference to Table 1, below.

TABLE 1

| Description | Engine State | Transmission Operating Range State | Applied Clutches | |
| --- | --- | --- | --- | --- |
| MI_Eng_Off | OFF | EVT Mode I | C1 70 | |
| MI_Eng_On | ON | EVT Mode I | C1 70 | |
| FG1 | ON | Fixed Gear Ratio 1 | C1 70 | C4 75 |
| FG2 | ON | Fixed Gear Ratio 2 | C1 70 | C2 62 |
| MII_Eng_Off | OFF | EVT Mode II | C2 62 | |
| MII_Eng_On | ON | EVT Mode II | C2 62 | |
| FG3 | ON | Fixed Gear Ratio 3 | C2 62 | C4 75 |
| FG4 | ON | Fixed Gear Ratio 4 | C2 62 | C3 73 |

Each of the transmission operating range states is described in the table and indicates which of the specific clutches C1 70, C2 62, C3 73, and C4 75 are applied for each of the operating range states. A first continuously variable mode, i.e., EVT Mode I, or MI, is selected by applying clutch C1 70 only in order to "ground" the outer gear member of the third planetary gear set 28. The engine state can be one of ON ('MI_Eng_On') or OFF ('MI_Eng_Off'). A second continuously variable mode, i.e., EVT Mode II, or MII, is selected by applying clutch C2 62 only to connect the shaft 60 to the carrier of the third planetary gear set 28. The engine state can be one of ON ('MII_Eng_On') or OFF ('MII_Eng_Off'). For purposes of this description, when the engine state is OFF, the engine input speed is equal to zero revolutions per minute ('RPM'), i.e., the engine crankshaft is not rotating. A fixed gear operation provides a fixed ratio operation of input-to-output speed of the transmission 10, i.e., $N_I/N_O$, is achieved. A first fixed gear operation ('FG1') is selected by applying clutches C1 70 and C4 75. A second fixed gear operation ('FG2') is selected by applying clutches C1 70 and C2 62. A third fixed gear operation ('FG3') is selected by applying clutches C2 62 and C4 75. A fourth fixed gear operation ('FG4') is selected by applying clutches C2 62 and C3 73. The fixed ratio operation of input-to-output speed increases with increased fixed gear operation due to decreased gear ratios in the planetary gears 24, 26, and 28. The rotational speeds of the first and second electric machines 56 and 72, $N_A$ and $N_B$ respectively, are dependent on internal rotation of the mechanism as defined by the clutching and are proportional to the input speed measured at the input shaft 12.

In response to operator input via the accelerator pedal 113 and brake pedal 112 as captured by the user interface 13, the HCP 5 and one or more of the other control modules determine the commanded output torque, $T_{CMD}$, intended to meet the operator torque request, $T_O\_REQ$, to be executed at the output member 64 and transmitted to the driveline 90. Final vehicle acceleration is affected by other factors including, e.g., road load, road grade, and vehicle mass. The operating range state is determined for the transmission 10 based upon a variety of operating characteristics of the powertrain. This includes the operator torque request, communicated through the accelerator pedal 113 and brake pedal 112 to the user interface 13 as previously described. The operating range state may be predicated on a powertrain torque demand caused by a command to operate the first and second electric machines 56 and 72 in an electrical energy generating mode or in a torque generating mode. The operating range state can be determined by an optimization algorithm or routine which determines optimum system efficiency based upon operator demand for power, battery state of charge, and energy efficiencies of the engine 14 and the first and second electric machines 56 and 72. The control system manages torque inputs from the engine 14 and the first and second electric machines 56 and 72 based upon an outcome of the executed optimization routine, and system efficiencies are optimized thereby, to manage fuel economy and battery charging. Furthermore, operation can be determined based upon a fault in a component or system. The HCP 5 monitors the torque-generative devices, and determines the power output from the transmission 10 required to achieve the desired output torque to meet the operator torque request. As should be apparent from the description above, the ESD 74 and the first and second electric machines 56 and 72 are electrically-operatively coupled for power flow therebetween. Furthermore, the engine 14, the first and second electric machines 56 and 72, and the electro-mechanical transmission 10 are mechanically-operatively coupled to transmit power therebetween to generate a power flow to the output member 64.

Figure 3:
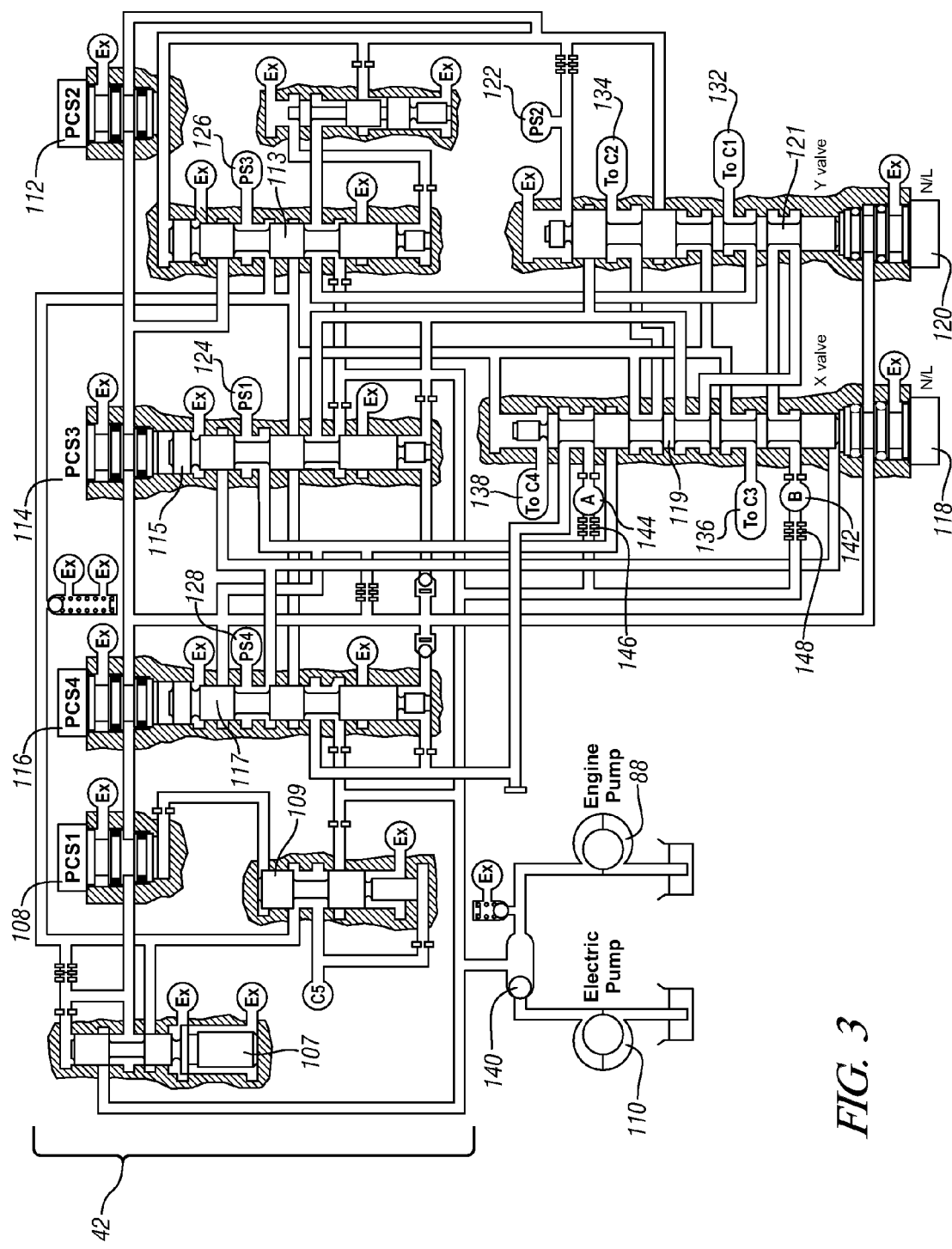
FIG. 3 is a schematic diagram of a hydraulic circuit, in accordance with the present disclosure.

FIG. 3 depicts a schematic diagram of the hydraulic control circuit 42 for controlling flow of hydraulic oil in the exemplary transmission. A main hydraulic pump 88 is driven off the input shaft 12 from the engine 14, and an auxiliary pump 110 controlled by the TPIM 19 to provide pressurized fluid to the hydraulic control circuit 42 through valve 140. The auxiliary pump 110 preferably comprises an electrically-powered pump of an appropriate size and capacity to provide sufficient flow of pressurized hydraulic oil into the hydraulic control circuit 42 when operational. The hydraulic control circuit 42 selectively distributes hydraulic pressure to a plurality of devices, including the torque-transfer clutches C1 70, C2 62, C3 73, and C4 75, active cooling circuits for the first and second electric machines 56 and 72 (not shown), and a base cooling circuit for cooling and lubricating the transmission 10 via passages 142, 144 (not depicted in detail). As previously stated, the TCM 17 actuates the various clutches to achieve one of the transmission operating range states through selective actuation of hydraulic circuit flow control devices comprising variable pressure control solenoids ('PCS') PCS1 108, PCS 2 112, PCS3 114, PCS4 116 and solenoid-controlled flow management valves, X-valve 119 and Y-valve 121. The hydraulic control circuit 42 is fluidly connected to pressure switches PS1, PS2, PS3, and PS4 via passages 124, 122, 126, and 128, respectively. The pressure control solenoid PCS1 108 has a control position of normally high and is operative to modulate the magnitude of fluidic pressure in the hydraulic circuit through fluidic interaction with controllable pressure regulator 107 and spool valve 109. The controllable pressure regulator 107 and spool valve 109 interact with PCS1 108 to control hydraulic pressure in the hydraulic control circuit 42 over a range of pressures and may provide additional functionality for the hydraulic control circuit 42. Pressure control solenoid PCS2 112 has a control position of normally high, and is fluidly connected to spool valve 113 and operative to effect flow therethrough when actuated. Spool valve 113 is fluidly connected to pressure switch PS3 via passage 126. Pressure control solenoid PCS3 114 has a control position of normally high, and is fluidly connected to spool valve 115 and operative to effect flow therethrough when actuated. Spool valve 115 is fluidly connected to pressure switch PS1 via passage 124. Pressure control solenoid PCS4 116 has a control position of normally low, and is fluidly connected to spool valve 117 and operative to effect flow therethrough when actuated. Spool valve 117 is fluidly connected to pressure switch PS4 via passage 128.

The X-Valve 119 and Y-Valve 121 each comprise flow management valves controlled by solenoids 118, 120, respectively, in the exemplary system, and have control states of High ('1') and Low ('0'). The control states refer to positions of each valve to which control flow to different devices in the hydraulic control circuit 42 and the transmission 10. The X-valve 119 is operative to direct pressurized fluid to clutches C3 73 and C4 75 and cooling systems for stators of the first and second electric machines 56 and 72 via fluidic passages 136, 138, 144, 142 respectively, depending upon the source of the fluidic input, as is described hereinafter. The Y-valve 121 is operative to direct pressurized fluid to clutches C1 70 and C2 62 via fluidic passages 132 and 134 respectively, depending upon the source of the fluidic input, as is described hereinafter. The Y-valve 121 is fluidly connected to pressure switch PS1 pressure switch PS2 via passage 122.

The hydraulic control circuit 42 includes a base cooling circuit for providing hydraulic oil to cool the stators of the first and second electric machines 56 and 72. The base cooling circuit includes fluid conduits from the valve 140 flowing directly to a flow restrictor which leads to fluidic passage 144 leading to the base cooling circuit for the stator of the first electric machine 56, and to a flow restrictor which leads to fluidic passage 142 leading to the base cooling circuit for the stator of the second electric machine 72. Active cooling of stators for the first and second electric machines 56 and 72 is effected by selective actuation of pressure control solenoids PCS2 112, PCS3 114 and PCS4 116 and solenoid-controlled flow management valves X-valve 119 and Y-valve 121, which leads to flow of hydraulic oil around the selected stator and permits heat to be transferred therebetween, primarily through conduction.

An exemplary logic table to accomplish control of the exemplary hydraulic control circuit 42 to control operation of the transmission 10 in one of the transmission operating range states is provided with reference to Table 2, below.

TABLE 2

| Transmission Operating Range State | X-Valve Logic No Latch | Y-Valve Logic C2 Latch | PCS1 Normal High | PCS2 Normal High | PCS3 Normal High | PCS4 Normal Low |
|---|---|---|---|---|---|---|
| EVT Mode I | 0 | 0 | Line Modulation | MG-B Stator Cool | C1 | MG-A Stator Cool |
| EVT Mode II | 0 | 1 | Line Modulation | C2 | MG-B Stator Cool | MG-A Stator Cool |
| Low Range | 1 | 0 | Line Modulation | C2 | C1 | C4 |
| High Range | 1 | 1 | Line Modulation | C2 | C3 | C4 |

A Low Range is defined as a transmission operating range state comprising one of the first continuously variable mode and the first and second fixed gear operations. A High Range is defined as a transmission operating range state comprising one of the second continuously variable mode and the third and fourth fixed gear operations. Selective control of the X-valve 119 and the Y-valve 121 and actuation of the solenoids PCS2 112, PCS3 114, PCS4 116 facilitate flow of hydraulic oil to actuate clutches C1 70, C2 63, C3 73, and C4 75, and provide cooling for the stators the first and second electric machines 56 and 72.

In operation, a transmission operating range state, i.e. one of the fixed gear and continuously variable mode operations, is selected for the exemplary transmission 10 based upon a variety of operating characteristics of the powertrain. This includes the operator torque request, typically communicated through inputs to the UI 13 as previously described. Additionally, a demand for output torque is predicated on external conditions, including, e.g., road grade, road surface conditions, or wind load. The operating range state may be predicated on a powertrain torque demand caused by a control module command to operate of the electrical machines in an electrical energy generating mode or in a torque generating mode. The operating range state can be determined by an optimization algorithm or routine operable to determine an optimum system efficiency based upon the operator torque request, battery state of charge, and energy efficiencies of the engine 14 and the first and second electric machines 56 and 72. The control system manages the input torques from the engine 14 and the first and second electric machines 56 and 72 based upon an outcome of the executed optimization routine, and system optimization occurs to improve fuel economy and manage battery charging. Furthermore, the operation can be determined based upon a fault in a component or system.

Figure 4:
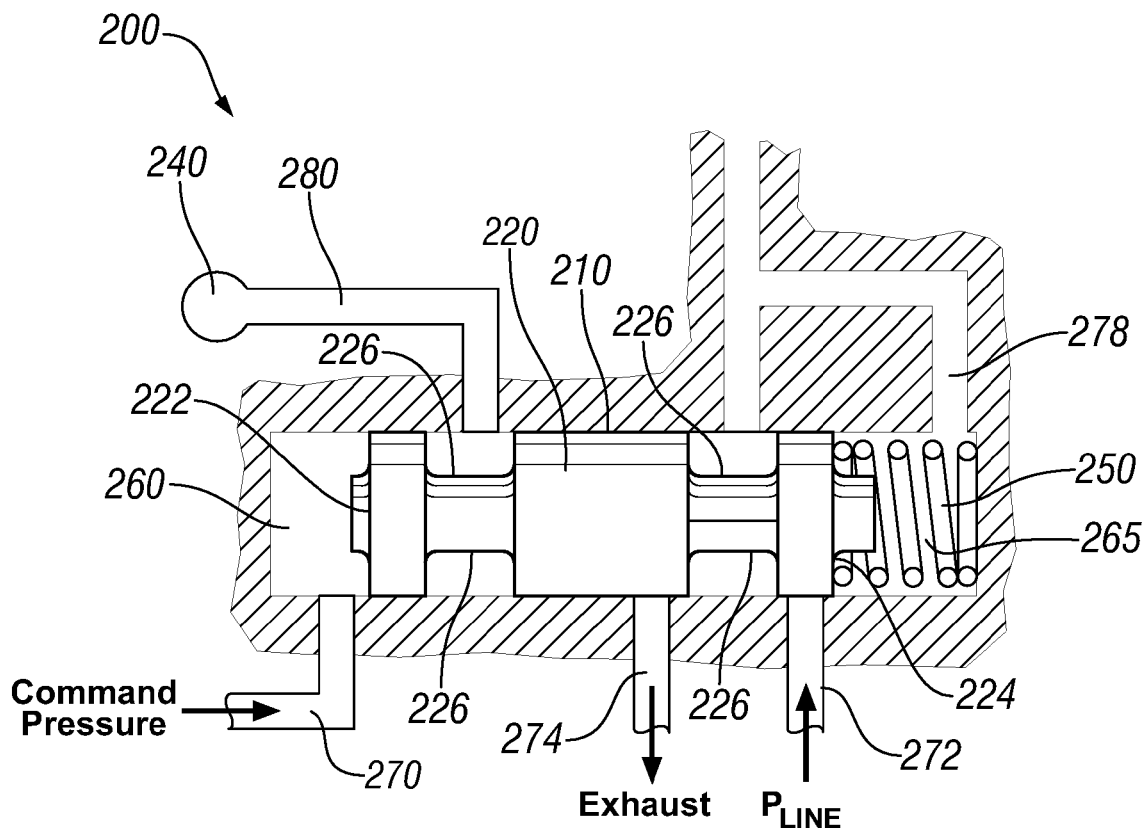
FIG. 4 schematically illustrates an exemplary clutch control circuit utilizing a hydraulically activated pressure control switch, in accordance with the present disclosure.

FIG. 4 schematically illustrates an exemplary clutch control circuit utilizing a hydraulically activated pressure control switch, in accordance with the present disclosure. Clutch control circuit 200 includes PCS 210, pressure switch 240, and hydraulic lines 270, 272, 274, 276, 278, and 280. PCS 210 selectively controls flow of pressurized hydraulic oil to and from a hydraulically actuated clutch (not shown) by translation of selecting mechanism within the PCS, in this exemplary embodiment, a spool valve plunger 220. Plunger 220 is selectively acted upon from a first end 222 of the plunger and a second end 224 of the plunger, the balance of forces determining the translative position of the plunger within the PCS. Plunger 220 includes plunger details 226 including holes, grooves, channels, or other features formed on the plunger in order to selectively direct hydraulic oil between various ports connecting hydraulic lines to PCS 210. The position of plunger 220 within PCS 210, corresponding to clutch states described above, selectively align plunger details 226 with hydraulic lines accomplishing the intended clutch function. In the exemplary clutch of FIG. 4, a plunger position to the right corresponds to a full feed state, wherein hydraulic pressure from a main pressure line 272 is channeled through plunger details 226 to clutch feed line 276. Similarly, a plunger position to the left corresponds to an exhaust state, wherein hydraulic oil within the clutch is allowed to escape the clutch and flow through exhaust line 274, entering a hydraulic control system return line (not shown). Selecting the position of plunger 220 is accomplished by modulating a command pressure to a command pressure line 270 feeding a command pressure volume 260 in contact with first end 222. As will be appreciated by one having ordinary skill in the art, force created by pressure on a surface can be determined through the following equation:

$$\text{FORCE}=\text{PRESSURE}*\text{SURFACE\_AREA\_ACTED\_UPON} \quad [1]$$

In the case of exemplary plunger 220, the force acting upon the plunger from the left equals the hydraulic pressure achieved within command pressure volume 260 times the surface area of first end 222. An increase in pressure within command pressure volume 260 increases the force acting upon plunger 220 from the side of first end 222. A valve return spring 250 applies a force to the second end 224, acting as a restorative force in the opposite direction of the pressure within command pressure volume 260. Force resulting from pressure within volume 260 and force from spring 250 act together such that increased pressure within command pressure volume 260 tends to move plunger 220 in one direction, and reduced pressure within command pressure volume 260 tends to move plunger 220 in the opposite direction. Exemplary PCS 210 includes another feature including a feedback line 278. Hydraulic oil flowing through clutch feed line 276 additionally flows or applies a pressure through feedback line 278. Hydraulic oil from feedback line 278 re-enters PCS 210 within a feedback pressure volume 265 located on the same side of plunger 220 as spring 250. Force resulting upon plunger 220 from hydraulic pressure within feedback pressure volume 265 counteracts force resulting from hydraulic pressure within command pressure volume 260. As a result, wherein a balance of forces resulting from pressure within command pressure volume 260 and spring 250 would cause plunger 220 to be in a position correlating to a full feed state, elevated pressure achieved within clutch feed line 276 associated with a clutch fill event reaching a certain progression creates a force acting upon plunger 220 away from the full feed state position. Calibration and/or control of feedback line 278 and resulting force upon plunger 220 corresponding to a selected pressure within command pressure volume 260 can create a self-correcting plunger position between the opposite ends of plunger travel, enabling an overlap state. Such an overlap state is useful for modulating the pressure achieved within the clutch, for example, enabling calibrated control to a touching state for the clutch. Full feed state can still be achieved despite operation of the feedback line 278 by setting pressure within the command pressure volume 260 to apply a force to plunger 220 exceeding the combination of the force applied by spring 250 and force resulting from hydraulic pressure within feedback pressure volume 265. PCS 210 is known to include pressure switch 240, fed by pressure switch line 280, utilized in known control methods to indicate pressure levels required for control of PCS 210. In this way, PCS 210 can selectively channel hydraulic oil to accomplish multiple states within a hydraulically activated clutch.

By modulating a command pressure, a PCS of the above exemplary configuration can operate in three states. A high command pressure commands a full feed state, allowing full exposure of $P_{LINE}$ to the clutch being filled. A low or null command pressure commands an exhaust state, blocking access of $P_{LINE}$ to the clutch and providing a path to exhaust hydraulic pressure from within the clutch. An intermediate or calibrated command pressure commands an overlap state. The function of an overlap state depends upon the calibration of the calibrated command pressure. An exemplary function of such an overlap state is to command a touching state in the clutch. Selective calibration of the command pressure to achieve the overlap state, in combination with monitored operation of the pressure switch, allows for accurately selecting a fill level within the clutch, for example, a fill level corresponding to a touching state in the clutch.

A number of PCS physical configurations are known. One exemplary PCS configuration, as described above, utilizes a cylindrical plunger located in a cylindrical housing. However, a multitude of shapes, configurations, activations methods, and calibration strategies are known in the art, and this disclosure is not intended to be limited to the particular exemplary embodiments described herein.

Pressure switch 240 is calibrated to indicate a pressure reaching some level. In the particular embodiment described in FIG. 4, the pressure switch can be utilized for example, to indicate a positive signal only when the PCS is in a full feed state. In such an exemplary use, the calibration of the pressure switch indication need not correspond to the actual pressures to which it is exposed, for example pressure levels in the command pressure volume 260, but can rather indicates some nominal level which the pressure always exceeds when the pressure switch is exposed to the pressurized hydraulic fluid.

As described above, operation and control of clutches are important to operating a complex powertrain, such as a hybrid powertrain. Drivability, fuel efficiency, and component life are all impacted by the operation of clutches within the system. Known methods utilizing look-up tables to control clutch activating devices, such as a PCS, are imprecise and inefficient. Much can be determined within a hydraulic control system based upon analysis of available inputs. A method is disclosed for localizing a preferred command pressure to attain a touching state within a transmission clutch based upon clutch fill times and pressure switch readings.

Figure 5:
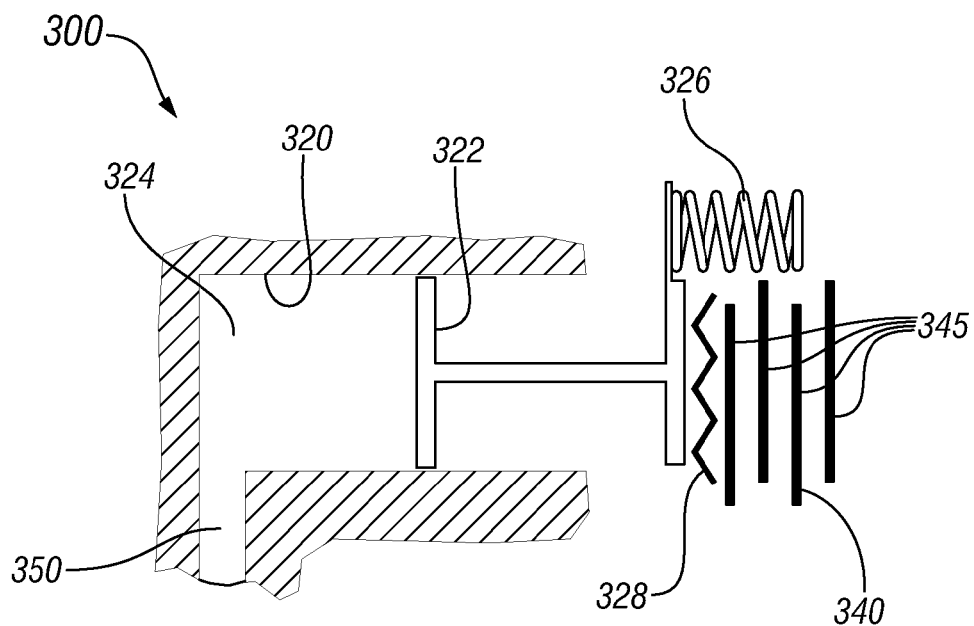
FIG. 5 schematically illustrates an exemplary hydraulically actuated clutch operated to provide clamping force upon a mechanical clutch, in accordance with the present disclosure.

A hydraulically actuated clutch utilizes selectively actuated pressurized hydraulic flow to create a desired motion or compression. An exemplary clutch operates by receiving pressurized hydraulic oil into a clutch volume chamber. FIG. 5 schematically illustrates an exemplary hydraulically actuated clutch operated to provide clamping force upon a mechanical clutch, in accordance with the present disclosure. Clutch assembly 300 comprises a clutch cylinder 320 and a mechanical clutch 340. Clutch cylinder 320 includes a piston 322 and a clutch volume chamber 324. Pressurized hydraulic fluid at some fill pressure enters clutch volume chamber 324 through hydraulic line 350. Hydraulic line 350 is fluidly connected with a mechanism for selectively applying hydraulic flow, such as an exemplary PCS device (not shown). Hydraulic oil in clutch volume chamber 324 exerts pressure upon features within the volume chamber. Piston 322 transforms the fill pressure exerted by the hydraulic fluid into a force. The force transmitted through piston 322 is used to articulate mechanical clutch 340 through various states required according to synchronous clutch operation described above. Positive hydraulic pressure is used to fill the clutch volume chamber 324 and move piston 322 in one direction. As will be appreciated by one having ordinary skill in the art, evacuation of hydraulic oil from clutch volume chamber 324 acts in some degree to move piston 322 in the other direction, but cavitation limits the ability of low pressure hydraulic fluid from effectively moving piston 322. As a result, return spring 326 is utilized to provide force to move piston 322 in the direction opposite to the direction achieved through the application of pressurized hydraulic fluid.

Mechanical clutch 340 is selectively actuated by the transmission of force through piston 322. Mechanical clutch 340 includes clutch connective surfaces in the form of clutch plates 345. Clutch plates 345 are connected to rotating members within the transmission (not shown). When mechanical clutch 340 is not actuated, clutch plates 345 are kept separate. Spinning of some fraction of clutch plates 345 does not cause spinning of the remaining fraction of clutch plates 345. When mechanical clutch 340 is actuated, clutch plates 345 are brought into contact with neighboring plates, and sufficient frictional forces between clutch plates 345 creates a locked relationship wherein the plates move in unison. Between rotating objects applying a torque, the torque capacity ('$T_C$') generated between the objects can be determined by the following equation:

$$T_C = \frac{2}{3} * f * F_A \quad [2]$$

f is the coefficient of friction between the rotating objects. As will be appreciated by one having ordinary skill in the art, f changes depending upon whether there is relative movement between the two objects. $F_A$ is the axial force applied normally to direction of rotation of the objects. $F_A$ in mechanical clutch 340 is generated by compressive force transmitted through piston 322. When the clutch is in a touching state, $F_A$ is kept at substantially zero, yielding zero torque capacity.

A process transitioning piston 322 from one extreme of motion to the other includes three distinct phases. A first phase, beginning from a fully unlocked state in the clutch, wherein no hydraulic pressure is being applied upon piston 322, the exemplary piston 322 is in a fully left position, as depicted in FIG. 5, and has no contact with mechanical clutch 340 or clutch plates 345. As pressurized hydraulic fluid at a fill pressure is directed into clutch volume chamber 324, force is applied to the piston and it begins to move to the right. Because piston 322 is not yet in contact with mechanical clutch 340, piston 322 moves relatively easily, and pressurized fluid entering clutch volume chamber 324 achieves a relatively rapid movement of piston 322. During this first phase, the volume of hydraulic fluid in the clutch volume chamber 324 changes rapidly. A third phase can be defined once piston 322 moves toward the right extreme of travel and contacts mechanical clutch 340, force applied upon piston 322 transmits force to mechanical clutch 340 and creates compressive pressure between clutch plate 345. Because piston 322 is subject to equal force from clutch plates 345 as the piston is transmitting, piston 322 moves much more slowly as a result of pressurized fluid acting upon the piston. In this third phase, because the piston only moves with additional compression of components of mechanical clutch 340, the volume of hydraulic fluid in clutch volume chamber 324 changes more slowly. In the transitional period between the piston in zero contact and the application of compressive force upon the clutch plates, a second phase can be defined wherein piston 322 transitions from a period of relatively rapid movement and a period of relatively slower movement. Abrupt application of force upon clutch plates 345 can have adverse effects, including damage to the plates and potential perception of the contact. Wave plate 328 can be used as part of mechanical clutch 340 to absorb some portion of force of the abrupt contact, making the transition between the first and third phases less abrupt. Further, a touching state can be defined wherein between the end of the first phase and the initiation of the second phase, wherein the piston begins to contact and exert force upon mechanical clutch 340 and wave plate 328.

As described above, clutches transition between locked and unlocked states, and clutches designed to operate synchronously or without slip require substantially zero relative velocity when reactive torque is transmitted through the clutch. Strategies for synchronous operation of clutches include synchronizing the clutch connective surfaces, then applying a clamping force to lock the clutch, thereby creating a clutch torque capacity in the clutch, and then transmitting reactive torque through the clutch.

Clutch control strategies, sequentially, and in some instance simultaneously, performing operations to synchronize the clutch plates, actuate the clutch to first the touching state and then to a fully locked state, and then ramp up torque capacity of the locked clutch. The order in which these operations are performed are important to synchronous operation, but also, the entire clutch transition must occur in as short a time span as possible to preserve drivability. Commands must be given to various powertrain components, accounting for reaction times, in order to generate the various operations involved in a shift occur in order with as little delay as possible. Commands and resulting actions can be simultaneous and overlapping, and understanding the time that various components take to reach a particular state in response to commands is important to coordinating the reactions in the order required in synchronous clutch operation. Commands to the hydraulic control system actuating the clutch and the resulting actions in the clutch are important to the sequential steps described above.

Figure 6:
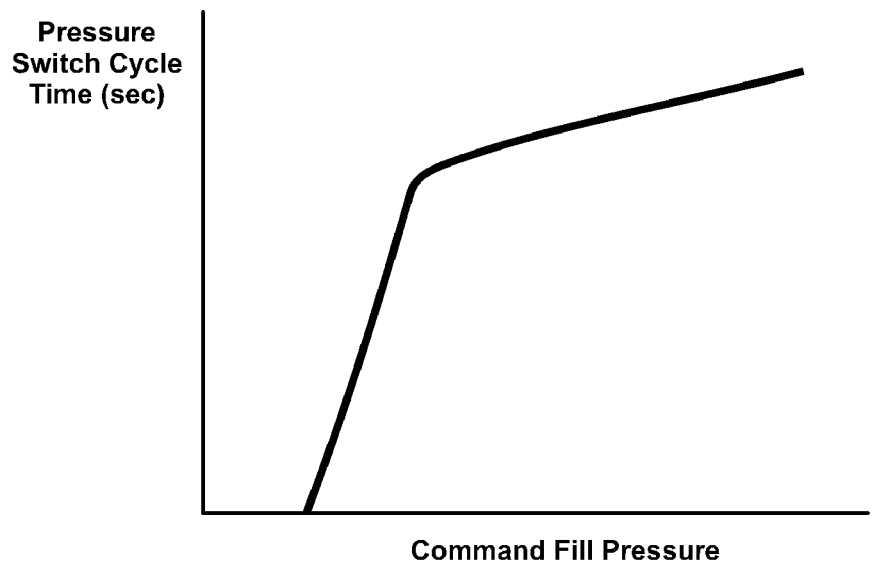
FIG. 6 graphically illustrates fill times required to reach an overlap state versus the command pressure in the PCS, in accordance with the present disclosure.

A pressure switch cycle time is a measure of the response times that result in clutch fill operations from the initiation of a hydraulic flow to a hydraulically actuated clutch until some clutch state of interest, as established by the configuration of the PCS controlling clutch operation. Pressure switch cycle times, measuring a time to a PCS entering a full feed state to exiting the full feed state, wherein an overlap state following the full feed state is intended to create a touching state in an associated clutch, can be utilized to diagnose a time until the clutch reaches a touching state through analysis of the times. An exemplary method to utilize pressure switch cycle times is to track, first, a pressure switch signal, corresponding to a command pressure initiating a full feed state and exceeding the calibrated pressure of the pressure switch, and, second, a pressure switch signal, corresponding to a drop in sensed pressure, for example, if the command pressure is cut off from the pressure sensor through the plunger of the PCS reaching an overlap state. The time span between these two pressure switch signals can be tracked as a pressure switch cycle time measuring the time required to create an overlap state in the PCS. FIG. 6 graphically illustrates fill times required to reach an overlap state versus command pressure in a PCS, in accordance with the present disclosure.

The exemplary data of FIG. 6 demonstrates an overall trend in the pressure switch cycle times. Fill pressures resulting in clutch feed line and within a clutch volume chamber are the result of $P_{LINE}$ applied to the PCS minus any pressure losses resulting from flow through the PCS and relates lines. Pressure losses resulting from flow can be described by the following equation:

$$\text{PRESSURE\_LOSS} = \text{FLOW} * \text{FLOW\_RESISTANCE} \quad [3]$$

Flow resistance is a fixed term for a fixed geometry of the PCS at a given setting. Pressure loss is therefore proportional to flow. Flow through the PCS to the clutch is high when the clutch piston is being displaced, for example, in the first phase described above. Flow through the PCS to the clutch is low when the clutch piston is relatively stationary, for example, in the third phase described above, wherein the piston is actively compressing the clutch plates. Applied to the trend in the data of FIG. 6, low command pressures correspond to low pressure switch cycle times. Pressure switch cycle times relate the time between the initiation and end of the full feed state. A low command pressure is easily countered by the feedback pressure resulting in the PCS from the application of $P_{LINE}$ in the full feed state. The resulting fill pressure in the clutch has only started to ramp up when the PCS is set to the overlap state, arresting any further increase in pressure within the clutch cylinder, so the PCS reaches the overlap state while the clutch is still in the first phase, described above. As the command pressures increase, the pressure switch cycle times also quickly increase. Because the clutch is still in the first phase described above wherein the piston is quickly displaced by hydraulic flow, the resulting high flow still results in high pressure losses. As a result, the fill pressure and the resulting pressure within the feedback loop rise slowly, resulting in significantly long incremental pressure switch cycle times with each incremental increase in the command pressure. Once the piston has been displaced and the clutch enters the third phase, described above, additional force applied to the piston through application of fill pressure produces less movement, corresponding to compression of the wave plate and clutch plates. Volume in the clutch volume chamber changes slowly, and the resulting hydraulic flow into the cylinder is reduced. As a result, pressure losses resulting from flow decrease, and the fill pressure rapidly approaches a static pressure or $P_{LINE}$. Because the fill pressure in this third phase increases rapidly, the time span needed to incrementally increase fill pressure decreases. Increases in command pressure at higher command pressures result in only small increases in pressure switch cycle times.

As a result of the above behavior, low command pressures to the PCS correspond to low pressure switch cycle times. As command pressures increase, the incremental times to reach an overlap state in the PCS increase quickly at first, and then more slowly as the clutch plates begin to compress. The transition between these two regions of pressure switch cycle time behavior describes the transition between the first phase and third phase, or the second phase. As described above, the touching state occurs between the end of the first phase and the initiation of the second phase.

As described above, command pressures in the steep section of the curve correspond to a PCS ceasing full feed state operation before the touching state in the connected clutch is achieved. In a clutch shift requiring that a touching state be efficiently achieved, transitioning the PCS to an overlap state before the touching state is reached is not preferable. However, high fill pressures overshoot the touching state in the clutch and can cause drivability issues. By analyzing a sample of pressure switch cycle times through a range of command pressures, differences in the cycle times for incremental increases in the command pressure can be used to calibrate or determine a preferred command pressure to quickly and precisely produce a touching state.

Figure 7:
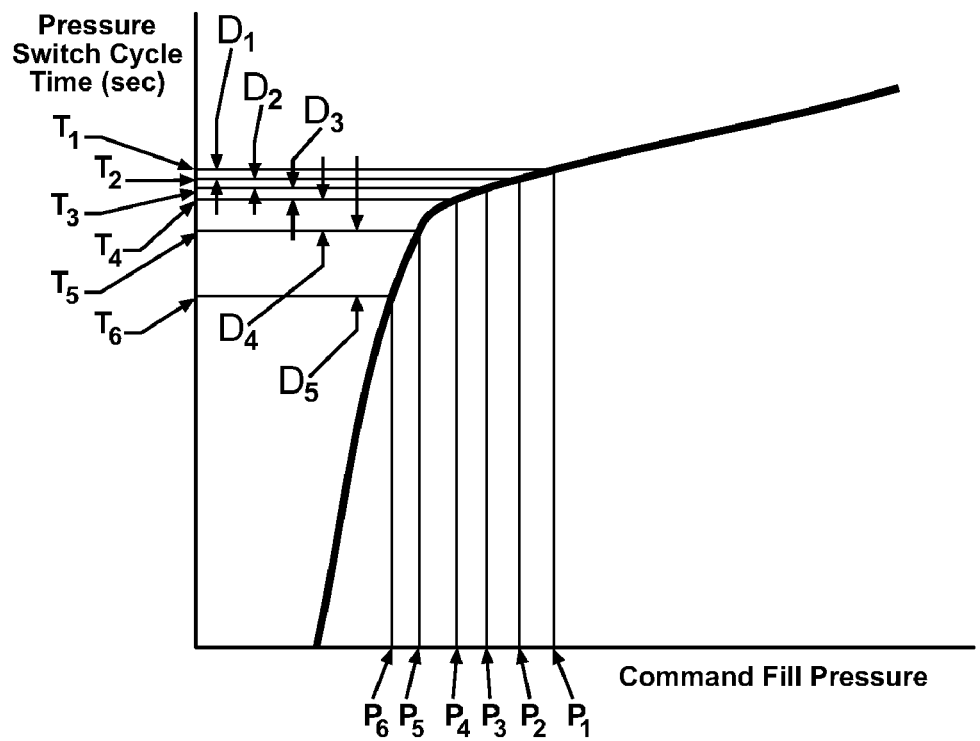
FIG. 7 graphically illustrates fill times required to reach an overlap state versus the command pressure through a range of incrementally decreased command pressures, in accordance with the present disclosure.

FIG. 7 graphically illustrates fill times required to reach an overlap state versus command pressure in a PCS through a range of incrementally decreased command pressures, in accordance with the present disclosure. As described above in relation to FIG. 6, command pressures in the steep section of the curve correspond to a PCS ceasing full feed state operation before the touching state in the connected clutch is achieved. Because this result in operation is not preferable and because overly high command pressures can be anticipated and adjusted for, a method to detect a transition in incremental pressure switch cycle times beginning with slightly high command pressures is preferred. Command pressures are shown as incrementally decreasing samples $P_1$ through $P_6$. Corresponding pressure switch cycle times are shown as $T_1$ through $T_6$. Changes between the pressure switch cycle times are depicted as $D_1$ through $D_5$. A comparison of D values yields little change between $D_1$ and $D_3$, with these values belonging to a subset of D values with the shortest changes to pressure switch cycle times. However, $D_4$ is significantly increased from $D_3$. This change indicates that a transition in pressure switch cycle times is indicated between $P_4$ and $P_5$. By selecting a preferred command pressure at or above $P_4$, the command pressure will not cease a full feed state prior to the touching state being achieved. One preferred method, to insure that the preferred command pressure is robustly above the transition point indicated in FIG. 7, is to add a command pressure adjustment to the first P value showing the increased D value. An exemplary command pressure increase is one and a half times the value of the incremental decrease utilized in the calibration samples. In the present exemplary data, this would create a preferred command pressure half way between $P_4$ and $P_3$. In this way, pressure switch cycle times can be compared through a range of command pressures to calibrate or determine a preferred command pressure to efficiently achieve a touching state.

The above methods to calibrate a preferred command pressure can be performed once and maintained indefinitely for use in filling the clutch. However, with changing temperatures and wear in the system over time, behavior of the clutch through a fill event can change. Characteristics of clutch fill events, such as measured pressure switch cycle times versus expected pressure switch cycle times, can be used to continually or periodically validate the preferred command pressure. In the event that the measure values differ from expected values by more than a threshold, the calibration process can be reinitiated to determine a new preferred command pressure. This process can occur a number of times through the lifespan of a powertrain in order to maintain an ability to precisely indicate a touching state in a clutch fill event.

Figure 8:
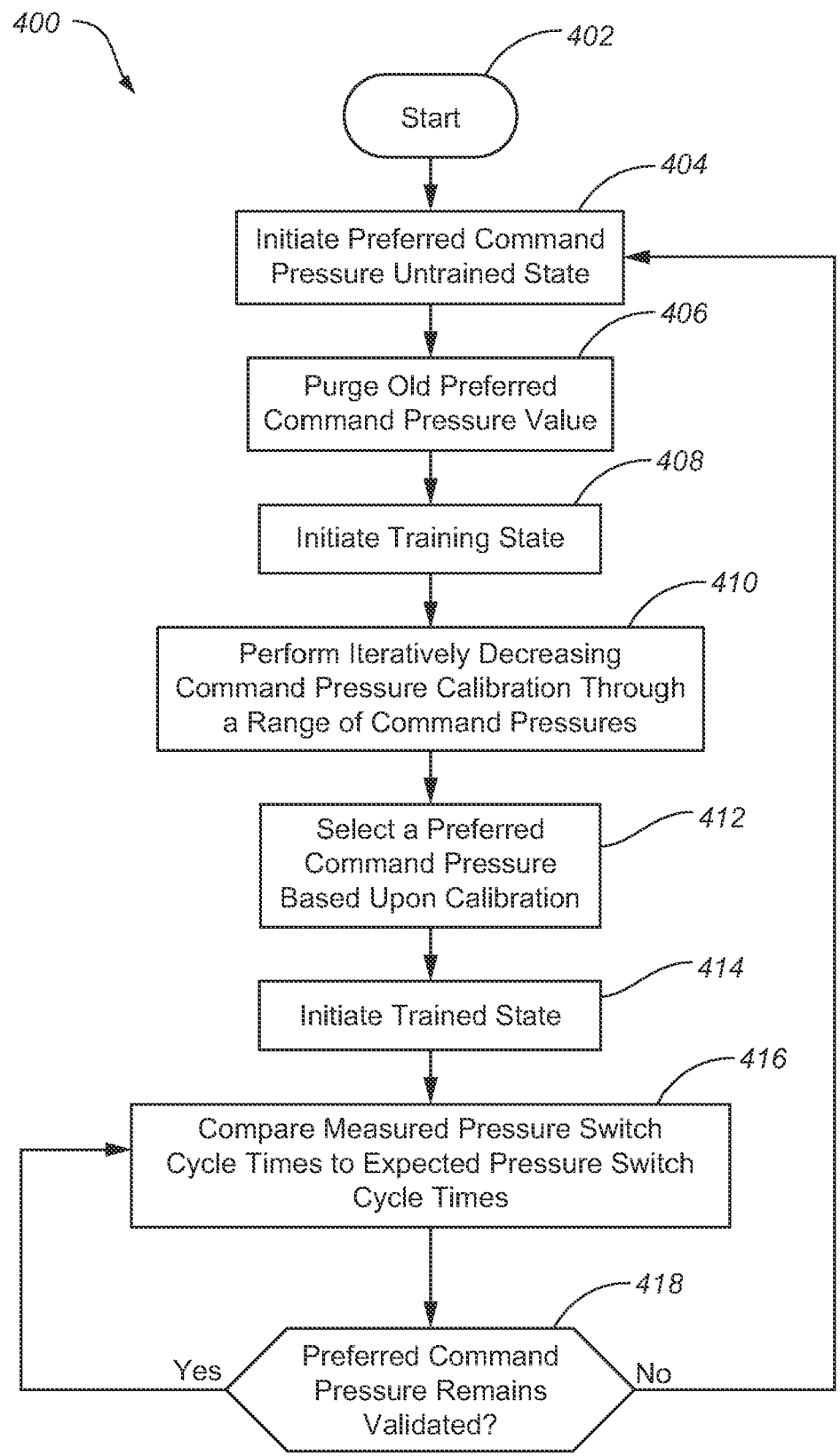
FIG. 8 illustrates a flowchart describing an exemplary process to select and continually validate preferred command pressures, in accordance with the disclosure.

FIG. 8 illustrates a flowchart describing an exemplary process to select and continually validate preferred command pressures, in accordance with the disclosure. Process 400 starts in step 402. At step 404, an untrained state is initiated. At step 406, an old preferred command pressure is purged, if it exists from a previous calibration. At step 408, a training state is initiated. At step 410, an iteratively decreasing command pressure calibration is performed, according to methods described herein. At step 412, a preferred command pressure indicating occurrence of a touching state is selected, according to methods described herein. At step 414, a trained state is initiated. At step 416, measured pressure switch cycle times are compared to expected pressure switch cycle times. At step 418, the comparison of 416 is utilized to either validate or invalidate the preferred command pressure. If the preferred command pressure remains validated, then the process reiterates to 416 wherein future measured fill times are compared to expected fill times. If the preferred command pressure is invalidated, then the process reiterates to step 404, wherein the selection of a new preferred command pressure begins.

The methods described herein can be performed in a PCS control module located within a larger control system or located individually as a unitary device.

It is understood that modifications are allowable within the scope of the disclosure. The disclosure has been described with specific reference to the preferred embodiments and modifications thereto. Further modifications and alterations may occur to others upon reading and understanding the specification. It is intended to include all such modifications and alterations insofar as they come within the scope of the disclosure.

The invention claimed is:

1. Method for controlling a powertrain comprising an electro-mechanical transmission mechanically-operatively coupled to an internal combustion engine and an electric machine adapted to selectively transmit mechanical power to an output member via selective application of a plurality of hydraulically-applied torque transfer clutches, said method comprising:
   applying through a series of clutch fill events a series of incrementally changing command pressures in a pressure control solenoid controllably connected to one of said clutches, each successive applied command pressure having a lower pressure than an immediately preceding applied command pressure and each command pressure is directed to a command pressure line feeding a command pressure volume to achieve a full feed state within the pressure control solenoid allowing full exposure of a main pressure line to said clutch being filled;
   monitoring a pressure switch fluidly connected to said pressure control solenoid and configured to indicate when said pressure switch is in the full feed state;
   determining changes in cycle times of said pressure switch, each cycle time measuring a time between an initiation and an end of the full feed state for each of the incrementally changed command pressures;
   selecting a preferred command pressure to achieve a touching state in said clutch based upon said changes in pressure switch cycle times; and
   controlling said clutch based upon said preferred command pressure.

2. The method of claim 1, wherein applying through said series of clutch fill events said series of incrementally changing command pressures comprises:
   applying a series of incrementally decreasing command pressures.

3. The method of claim 1, wherein selecting said preferred command pressure based upon said changes in pressure switch cycle times comprises:
   selecting a lowest of said command pressures conforming with a subset of shortest of said changes in cycle times of said pressure switch.

4. The method of claim 1, wherein selecting said preferred command pressure based upon said changes in pressure switch cycle times comprises:
   identifying a first of said command pressures to create an overlap state to correspond to a change in cycle times of said pressure switch not conforming with a subset of shortest of said changes in cycle times of said pressure switch; and
   selecting as said preferred command pressure a value equaling the sum of said identified first of said command pressures and a command pressure adjustment.

5. The method of claim 4, wherein said command pressure adjustment equals one and a half times said incremental change utilized in said series of incrementally changing command pressures.

6. The method of claim 1, further comprising:
   monitoring said controlling said clutch based upon said preferred command pressure; and
   if said monitoring said controlling ceases to validate said preferred command pressure, selecting a new preferred command pressure.

7. Method for controlling a powertrain comprising an electro-mechanical transmission mechanically-operatively coupled to an internal combustion engine and an electric machine adapted to selectively transmit mechanical power to an output member via selective application of a plurality of hydraulically-applied torque transfer clutches, said method comprising:
   selecting a preferred command pressure in a pressure control solenoid fluidly connected to one of said clutches, said selecting comprising
      iteratively filling said clutch with a calibration command pressure, wherein each successive iteration of said calibration command pressure has a lower pressure than an immediately preceding iteration of said calibration command pressure and said calibration command pressure is directed to a command pressure line feeding a command pressure volume to achieve a full feed state within the pressure control solenoid allowing full exposure of a main pressure line to said clutch being filled,
      monitoring pressure switch cycle times for a pressure switch fluidly connected to said pressure control solenoid and configured to generate an indication when said pressure control solenoid is in the full feed state, each cycle time measuring a time between an initiation and an end of the full feed state, and
      selecting from said calibration command pressures said preferred command pressure based upon identifying a transition between differences in said calibration command pressures, said transition corresponding to a touching state in said clutch; and utilizing said preferred command pressure in subsequent operation of said clutch.

8. The method of claim 7, further comprising:

comparing pressure switch cycles times during said subsequent operation of said clutch to expected cycle times; and reselecting said preferred command pressure based upon said comparing.

9. An apparatus for controlling a powertrain comprising an electro-mechanical transmission mechanically-operatively coupled to an internal combustion engine and an electric machine adapted to selectively transmit mechanical power to an output member via selective application of a plurality of hydraulically-applied torque transfer clutches, said method comprising:

a pressure control solenoid fluidly connected to one of said clutches;

a pressure switch fluidly connected to said pressure control solenoid monitoring when said pressure control solenoid is in a full feed state;

a pressure control solenoid control module, including programming to apply through a series of clutch fill events a series of incrementally changing command pressures in said pressure control solenoid to create an overlap state in said pressure control solenoid, each successive applied command pressure having a lower pressure than an immediately preceding applied command pressure and each command pressure is directed to a command pressure line feeding a command pressure volume to achieve the full feed state within the pressure control solenoid allowing full exposure of a main pressure line to said clutch being filled, monitor said pressure switch, determine changes in cycle times of said pressure switch, each cycle time measuring a time between an initiation and an end of the full feed state for each of the incrementally changed command pressures, select a preferred command pressure based upon a transition in said changes in pressure switch cycle times, said transition corresponding to a touching state in said clutch, and control said clutch based upon said preferred command pressure.

10. The apparatus of claim 9, wherein said series of incrementally changing command pressures comprises a series of incrementally decreasing command pressures.

11. The apparatus of claim 10, wherein said programming to select said preferred command pressure based upon said changes in pressure switch cycle times comprises:

selection of a lowest of said command pressures conforming with a subset of shortest of said changes in cycle times of said pressure switch.

12. The apparatus of claim 9, wherein said programming further comprises:

validation of said preferred command pressure through subsequent operation of said clutch; and reselection of said preferred command pressure based upon a failure in said validation.

\* \* \* \* \*